(12) United States Patent
Zhang et al.

(10) Patent No.: US 10,198,040 B2
(45) Date of Patent: Feb. 5, 2019

(54) ELECTRONIC DEVICES WITH FLEXIBLE DISPLAYS

(71) Applicant: Apple Inc., Cupertino, CA (US)

(72) Inventors: Zhen Zhang, San Jose, CA (US); Victor H. Yin, Cupertino, CA (US); Cyrus Y. Liu, Cupertino, CA (US); Paul S. Drzaic, Morgan Hill, CA (US); Sungwon Bae, Pleasanton, CA (US); Chun-Hao Tung, San Jose, CA (US); Kiarash Vakhshouri, San Jose, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/272,957

(22) Filed: Sep. 22, 2016

(65) Prior Publication Data
US 2017/0336831 A1    Nov. 23, 2017

Related U.S. Application Data

(60) Provisional application No. 62/339,654, filed on May 20, 2016.

(51) Int. Cl.
*G06F 1/16* (2006.01)
*G06F 3/041* (2006.01)
*G06F 3/044* (2006.01)

(52) U.S. Cl.
CPC .......... *G06F 1/1652* (2013.01); *G06F 1/1626* (2013.01); *G06F 1/1643* (2013.01);
(Continued)

(58) Field of Classification Search
CPC ...... G06F 1/1652; G06F 3/0416; G06F 3/044; G06F 3/0412; G06F 2203/04102;
(Continued)

(56) References Cited

U.S. PATENT DOCUMENTS

| 5,118,540 | A * | 6/1992 | Hutchison | ................. B32B 7/02 428/40.7 |
| 7,548,670 | B2 | 6/2009 | Ijzerman et al. | |

(Continued)

FOREIGN PATENT DOCUMENTS

| EP | 2993870 A1 | 3/2016 |
| EP | 3015518 A1 | 5/2016 |

(Continued)

*Primary Examiner* — Srilakshmi K Kumar
*Assistant Examiner* — Brent D Castiaux
(74) *Attorney, Agent, or Firm* — Treyz Law Group, P.C.; G. Victor Treyz; David K. Cole

(57) ABSTRACT

An electronic device may have a flexible portion that allows the device to be folded. The device may have a flexible display. The flexible display may have a flexible display layer, a cover layer, a touch sensor interposed between the flexible display layer and the cover layer, a support layer, and a polarizer layer. The polarizer layer may be interposed between the touch sensor and the flexible display or between the touch sensor and the cover layer. The touch sensor may include optically clear adhesive that is flexible and facilitates bending of the display. The optically clear adhesive may include additives such as water vapor penetration reducing additive, anticorrosion additive, ultraviolet-light blocking additive, and index-of-refraction adjustment additive. The support layer may be formed from shape memory alloy or amorphous metal and may have openings to facilitate bending.

19 Claims, 5 Drawing Sheets

(52) U.S. Cl.
CPC ............ *G06F 3/044* (2013.01); *G06F 3/0412* (2013.01); *G06F 3/0416* (2013.01); *G06F 2203/04102* (2013.01); *G06F 2203/04103* (2013.01)

(58) Field of Classification Search
CPC ......... G06F 2203/04103; G06F 1/1626; G06F 1/164; G06F 2203/041033
See application file for complete search history.

(56) References Cited

U.S. PATENT DOCUMENTS

| | | | |
|---|---|---|---|
| 9,101,007 B2 | 8/2015 | Chan et al. | |
| 2009/0109537 A1 | 4/2009 | Bright et al. | |
| 2014/0009215 A1* | 1/2014 | Prest | G06F 3/044 327/517 |
| 2014/0015772 A1* | 1/2014 | Tung | G06F 3/041 345/173 |
| 2014/0092342 A1* | 4/2014 | Franklin | G02B 6/0088 349/62 |
| 2014/0227502 A1 | 8/2014 | Katami et al. | |
| 2015/0022740 A1* | 1/2015 | Lee | G06F 3/044 349/12 |
| 2015/0090573 A1 | 4/2015 | Mansky et al. | |
| 2015/0268697 A1* | 9/2015 | Nam | G06F 1/1652 428/157 |
| 2015/0378391 A1* | 12/2015 | Huitema | G06F 1/163 361/679.03 |
| 2016/0045953 A1 | 2/2016 | Park et al. | |
| 2016/0091923 A1 | 3/2016 | Morrison et al. | |

FOREIGN PATENT DOCUMENTS

| | | |
|---|---|---|
| WO | 2014/078115 | 5/2014 |
| WO | 2016021862 A1 | 2/2016 |

* cited by examiner

ELECTRONIC DEVICES WITH FLEXIBLE DISPLAYS

This application claims the benefit of provisional patent application No. 62/339,654, filed May 20, 2016, which is hereby incorporated by reference herein in its entirety.

BACKGROUND

This relates generally to electronic devices and, more particularly, to electronic devices with displays.

Electronic devices often include displays. For example, computers, cellular telephones, and other devices may use displays to present visual information to a user. It may be desirable to provide displays with flexible portions. This may allow portions of a display to be bent. Care must be taken, however, to ensure that displays are sufficiently robust to avoid damage when bent.

SUMMARY

An electronic device may have a flexible portion that allows the device to be folded. The device may have a flexible display. The flexible display may have a bending region that allows the display to bend along a bend axis when the device is folded.

The flexible display may have a flexible display layer, a cover layer, a touch sensor interposed between the flexible display layer and the cover layer, a support layer, and a polarizer layer. The polarizer layer may be interposed between the touch sensor and the flexible display layer or between the touch sensor and the cover layer.

The touch sensor may include layers of optically clear adhesive that is flexible and facilitates bending of the display. The optically clear adhesive may include additives such as water vapor penetration reducing additive, anticorrosion additive, ultraviolet-light blocking additive, and index-of-refraction adjustment additive. The support layer may be formed from shape memory alloy or amorphous metal and may have openings to facilitate bending of the display along the bend axis.

DETAILED DESCRIPTION

Figure 1:
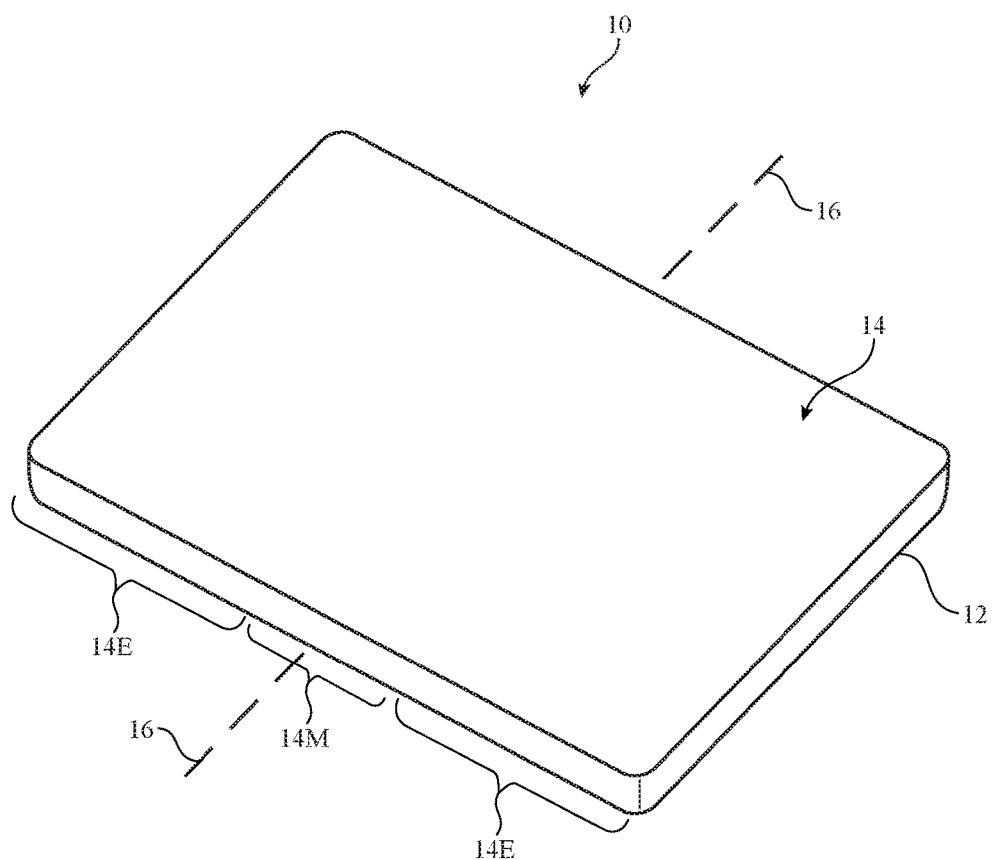
FIG. 1 is a perspective view of an illustrative electronic device with a display in accordance with an embodiment.

An electronic device such as electronic device 10 of FIG. 1 may have a display such as display 14. Device 10 may be a laptop computer, a tablet computer, a cellular telephone, a wristwatch, or other electronic device (e.g., a portable device, handheld device, etc.).

Display 14 may be mounted in a housing such as housing 12. Housing 12 may be formed of plastic, glass, ceramics, fiber composites, metal (e.g., stainless steel, aluminum, etc.), other suitable materials, or a combination of any two or more of these materials.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures (as an example).

Display 14 may include an array of display pixels formed from liquid crystal display (LCD) components, an array of electrophoretic display pixels, an array of organic light-emitting diode display pixels, an array of pixels formed from crystalline semiconductor light-emitting diode dies (sometimes referred to as micro-LEDs), an array of electrowetting display pixels, or display pixels based on other display technologies. Examples in which display 14 has been formed from organic light-emitting diode pixels or micro-LED pixels may sometimes be described herein as an example).

Display 14 may have one or more portions that bend. The bent portions may be flexed back and forth during use of device 10 (e.g., when device 10 is being opened and closed like a book) or may be placed in a permanently bent configuration (e.g., when an inactive portion of display 14 is bent to accommodate mounting in a compact housing).

In the illustrative example of FIG. 1, device 10 is bendable (foldable) along bend axis 16. To accommodate bending about bend axis 16, display 14 and housing 12 may have a flexible portion that overlaps bend axis 16. For example, display 14 may have a flexible central portion 14M and housing 12 may have an associated bendable central portion that runs along bend axis 16. The bendable portion of housing 12 may be formed from flexible materials, from rigid materials (e.g., rigid materials that are coupled using hinge structures), or other suitable structures. Bendable portion 14M may be interposed between edge portions 14E of display 14. Edge portions 14E may be rigid or flexible. For example, edge portions 14E may be flexible display portions that are rigidly maintained in a desired planar shape by rigid edge portions of housing 12. Display 14 may be folded so that display portions 14E face each other and/or so that portions 14E face away from each other.

Figure 2A:
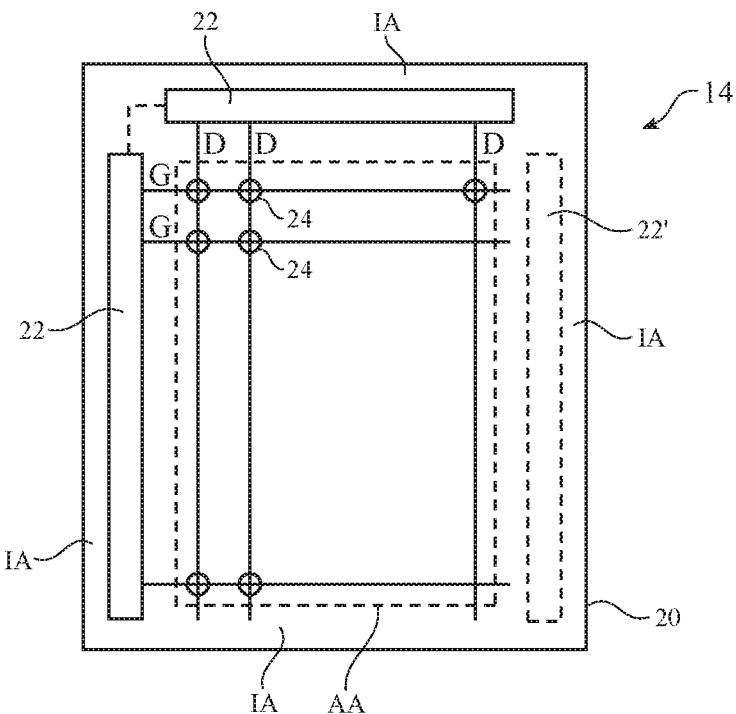
FIG. 2A is a top view of an illustrative display in accordance with an embodiment.

FIG. 2A is a diagram of an illustrative display. As shown in FIG. 2A, display 14 may have an array of pixels 24 formed on a substrate such as substrate 20. Display driver circuitry 22 may include gate driver circuitry that is used to supply control signals G (sometimes referred to as horizontal control signals, emission control signals, scan signals, gate line signals, etc.) on horizontal lines (sometimes referred to as gate lines). There may be one or more gate lines associated with each row of pixels 24. Gate driver circuitry may be located along one edge of display 14 (e.g., the left edge of display 14) and/or two edges of display 14 (see, e.g., illustrative gate driver circuitry 22' on the right edge of display 14 in the example of FIG. 2A). While control signals are being supplied to rows of pixels 24 using gate lines G, display driver circuitry 22 may be used to supply data signals D to pixels 24 using data lines that run along respective columns of pixels 24. During operation, the active area AA of display 14, which contains pixels 24, displays images for a user. The inactive area IA of display 14 that runs along the borders of active area AA does not have any pixels 24 and therefore does not display images. Circuitry such as display driver circuitry 22, routing lines, and other non-pixel circuitry may be located in inactive area IA.

Each of pixels 24 may include an organic light-emitting diode and a thin-film transistor pixel circuit having components such as thin-film transistors and thin-film capacitors for controlling the operation of the organic light-emitting diode. Each pixel circuit may receive data signals D on vertical data lines and may receive control signals G on one or more horizontal control lines (gate lines). The thin-film circuitry of each pixel may contain switching transistors, emission enable transistors, a drive transistor that controls current flow through the organic light-emitting diode in the pixel, one or more thin-film capacitors, and other circuitry. Power lines such as metal traces on display substrate 20 may carry a positive power supply signal and a ground power signal to each of pixels 24. Pixels 24 may contain light-emitting diodes of different colors (e.g., red, green, and blue) so that display 14 has the ability to display color images.

If desired, display 14 may have liquid crystal display structures (e.g., a flexible thin-film transistor layer, a layer of liquid crystal material, a flexible color filter layer, etc.). The use of flexible display layers such as the illustrative flexible organic light-emitting diode display layer of FIG. 2A may sometimes be described herein as an example.

Figure 2B:
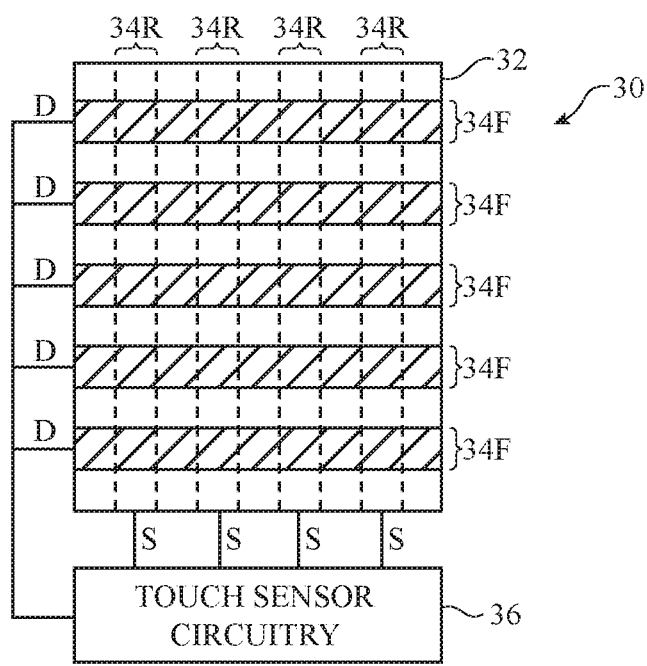
FIG. 2B is a top view of an illustrative touch sensor for a display in accordance with an embodiment.

Display 14 may be provided with a touch sensor such as a capacitive touch sensor to gather touch input from a user. An illustrative touch sensor for display 14 is shown in FIG. 2B. As shown in FIG. 2B, touch sensor 30 may have a touch sensor substrate such as substrate 32. Substrate 32 may be formed from a flexible layer such as a polyimide layer or other sheet of elastomeric polymer. Capacitive electrodes such as horizontal strip-shaped electrodes 34F may extend across the front surface of substrate 32 and capacitive electrodes such as vertical strip-shaped electrodes 34R may extend across the rear surface of substrate 32. Configurations in which the electrodes of sensor 30 are all formed on one side of substrate 32 and/or have different shapes (e.g., squares, diamonds, lines, etc.) may also be used. If desired, touch sensor electrodes for touch sensor 30 may be formed on display substrate 20 (i.e., touch sensor electrodes may be integrated with pixel structures for display 14). The touch sensor electrode configuration of the touch sensor layer of FIG. 2B is merely illustrative.

As shown in FIG. 2B, touch sensor circuitry 36 may be coupled to touch sensor electrodes 34R and 34F. During operation, touch sensor circuitry 36 may supply electrodes 34F of sensor 30 with drive signals (D) and may monitor electrodes 34R for corresponding sense signals (S). By processing signals S, the location of a user's finger and/or other external object may be detected. During operation, touch sensor 30 may be used to gather touch gestures (e.g., swipe gestures, pinch-to-zoom gestures, etc.) and other touch input and may therefore be used in controlling the operation of device 10.

Figure 3A:
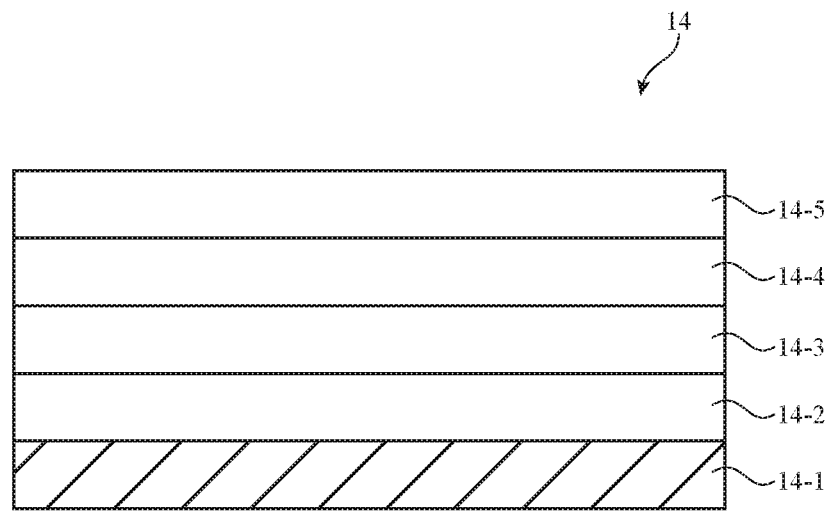
FIG. 3A is a cross-sectional side view of an illustrative display in accordance with an embodiment.

FIG. 3A is a cross-sectional side view of display 14 in an illustrative configuration in which display 14 has a support layer such as support layer 14-1. Other layers of display 14 such as layers 14-2, 14-3, 14-4, and 14-5 may be formed on support layer 14-1. If desired, adhesive may be used in attaching the layers of display 14 to each other. With one illustrative arrangement, layer 14-2 is an organic light-emitting diode display layer (see, e.g., substrate 20 and the array of pixels 24 and other thin-film circuitry of FIG. 2A), layer 14-3 is a touch sensor layer (see, e.g., substrate 32 and the electrodes of sensor 30 of FIG. 2B), layer 14-4 is a circular polarizer to suppress light reflections from metal lines and other reflective structures in layers 14-2 and 14-3, and layer 14-5 is a protective polymer display cover layer (e.g., a flexible clear polymer layer with optional coatings such as an antiscratch coating, antismudge coating, antireflection coating, etc.). With another illustrative arrangement, layer 14-2 may be an organic light-emitting diode layer, layer 14-3 may be a polarizer layer, layer 14-4 may be a touch sensor layer, and layer 14-5 may be a flexible cover layer. Other stacks of display layers may be used in forming flexible display 14, if desired. The configuration of FIG. 3A is merely illustrative.

Support layer 14-1, which may sometimes be referred to as a substrate, backing layer, or backing film, may be a flexible polymer layer, a thin flexible metal layer, or other suitable flexible supporting layer. In some configurations, undesired plastic deformation of support layer 14-1 in region 14M may be prevented by forming support layer 14-1 from a material that has a relatively high yield strain. The yield strain of layer 14-1 may, for example, be greater than 1%. If desired, layer 14-1 may be formed from a material with a yield strain of greater than 0.5%, less than 2%, or other suitable amount.

The material that forms layer 14-1 may be a shape memory alloy (e.g., nickel titanium) or a bulk metal glass (sometimes referred to as amorphous metal). An example of a shape memory alloy with a yield strain of greater than 1% (i.e., a yield strain of 1.1%) is a nickel titanium having 55.8 weight percent of nickel, less than 0.5 weight percent of oxygen, less than 0.2 weight percent of carbon, and a remainder formed from titanium. An example of an amorphous metal that may be used in forming support layer 14-1 is an alloy of zirconium (65 weight percent), copper (17.5 weight percent), nickel (10 weight percent), and aluminum (7.5 weight percent). Bulk metal glasses may be based on alloys of titanium, palladium, zirconium, iron, cobalt, nickel and other suitable materials. The material that forms layer 14-1 may be a metal matrix composite having an amorphous metal and a reinforcing element, such as carbon fibers, silicon carbide fibers, or boron filaments.

Because metals are relatively stiff relative to materials such as flexible polymers, the thickness of layer 14-1 may be minimized while still providing sufficient structural support for the other layers of display 14. For example, the thickness of layer 14-1 may be 50-90 microns, may be 40-120 microns, may be 30-100 microns, may be more than 25 microns, or may be less than 125 microns (as examples).

Figure 3B:
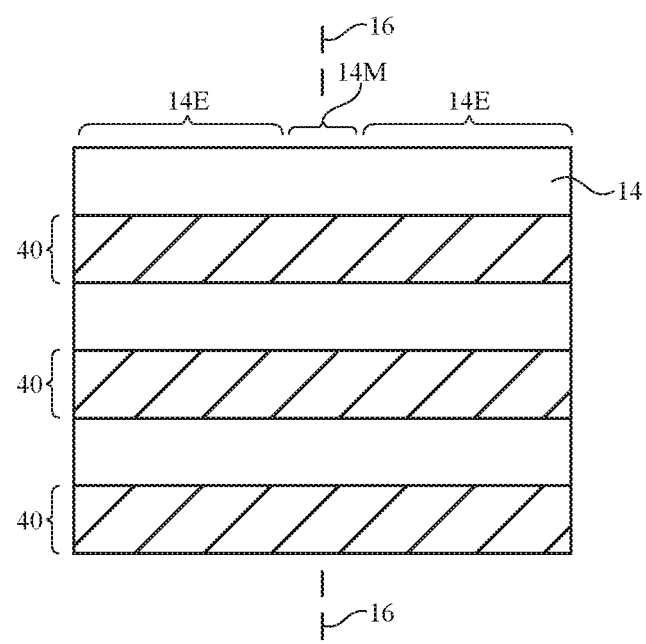
FIG. 3B is a rear view of an illustrative display in accordance with an embodiment.

To help restore display 14 to a desired planar shape in bending region 14M after display 14 has been unfolded during use, the rear of display 14 may be provided with bistable metallic strips or other spring structures, as shown by illustrative bistable metallic members 40 on the rear of display 14 in FIG. 3B. Members 40 may run across bend region 14M (and, if desired, display 14) perpendicular to bend axis 16. There may be one member 40, more than two members 40, more than five members 40, more than 10 members 40, 10-40 members 40, fewer than 25 members 40, or other suitable number of members 40 in display 14. Members 40 may be attached to the rear of housing 12 (e.g., to layer 14-1 or other display layers) using adhesive, fasteners, welds, or other attachment mechanisms. When device 10 is folded, members 40 may bend to allow display 14 to bend about axis 16. When device 10 is unfolded, members 40 may spring back into their original planar state, thereby helping to flatten display 14.

Bistable elements in display 14 (i.e., members 40) may be formed form thin sheet metal members that have been formed into shapes with curved cross-sectional profiles. This shape causes the bistable elements to that resist bending until more than a threshold amount of bending force has been applied. Once the threshold bending force has been supplied, the bistable elements may buckle and allow device 10 to be freely folded. When device 10 is unfolded, the bistable elements will snap back into their original shapes to maintain display 14 in a desired planar state.

Figure 4:
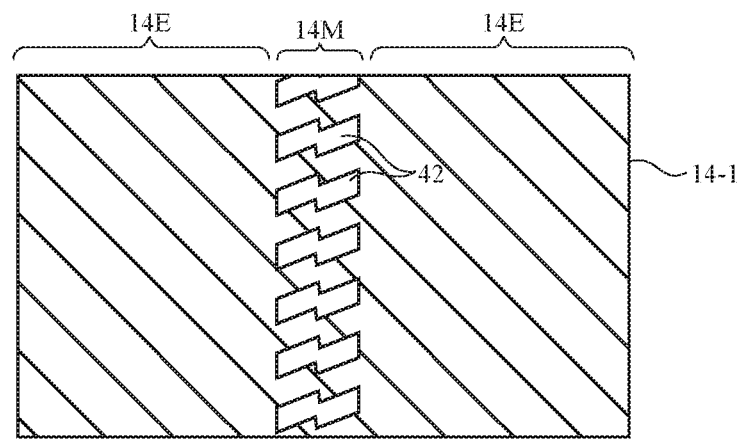
FIG. 4 is a top view of an illustrative display backing layer having openings that overlap a bend axis to facilitate display bending in accordance with an embodiment.
Figure 5:
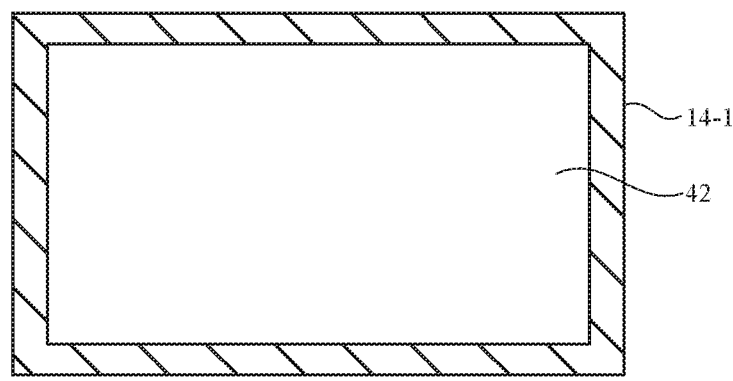
FIG. 5 is a top view of an illustrative frame-shaped display backing layer in accordance with an embodiment.
Figure 6:
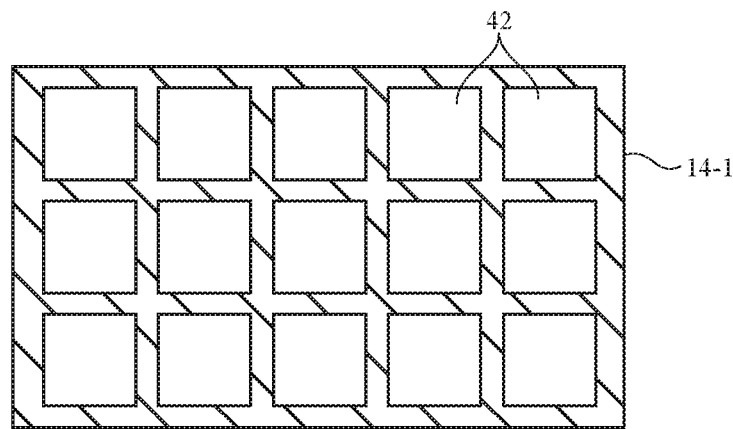
FIG. 6 is a top view of an illustrative grid-shaped display backing layer in accordance with an embodiment.

Support layer 14-1 may have any suitable shape. In the example of FIG. 4, support layer 14-1 has a substantially rectangular shape and has a set of openings 42 that overlap region 14M and enhance the flexibility of support layer 14-1 along bend axis 16. In the example of FIG. 5, support layer 14-1 has the shape of a rectangular ring (i.e., a frame shape) surrounding a central rectangular opening (opening 42). FIG. 6 shows how support layer 14-1 may have a grid shape with an array of rectangular (square) openings 42. If desired, openings 42 may have other shapes (circular, oval, triangular, etc.) and/or may be provided in other patterns (e.g. other patterns that overlap region 14-M, etc.).

The display and touch components of display 14 may have metal lines and other structures that are prone to corrosion if exposed to the environment (heat, humidity, air, etc.). To help protect display 14 from damage, water vapor barrier structures may be incorporated into display 14. Water vapor barrier layers based on thin-film deposited inorganic layers or thin-film deposited layers of alternating organic and inorganic layers may be brittle and prone to cracking. Accordingly, it may be desirable to incorporate water vapor barrier materials into flexible adhesive layers in display 14. Examples of water vapor barrier additives (water vapor penetration reduction additives) that may be incorporated into adhesive layers in display 14 include fluorocarbons, olefins, dienes, carbonates, acrylics, and other hydrophobic polymers. Sufficient amounts of these additives may be incorporated into the adhesive layers in display 14 to help prevent water vapor from the environment from reaching sensitive structures in display 14 such as metal, indium tin oxide, organic emissive material, and other materials that may be subject to damage from water. Materials that help decrease water vapor penetration by promoting polymer crosslinking in the adhesive layers and/or that serve as desiccants (water vapor absorbers) may also be incorporated into the adhesive layers of display 14. By incorporating water vapor pentation reducing additive into the adhesive layers of display 14, the water vapor transmission rate (WVTR) for the adhesive layer(s) may be held to less than 5000 g/m$^2$-day at 65° C. and 90% humidity for an adhesive layer thickness of 5 microns or more.

The adhesive layers in display 14 into which water vapor penetration reducing additives are incorporated may be transparent and may sometimes be referred to as optically clear adhesive (OCA) layers. The adhesive layers may be formed from acrylic adhesives or other polymer adhesives having a modulus of elasticity (sometimes referred to as Young's modulus or elastic modulus) of $10^4$-$10^5$ Pa or other suitable values (e.g., less than $10^6$ Pa, less than $10^5$ Pa, less than $10^4$ Pa, more than $10^3$ Pa, etc.). These relatively low elastic modulus values allow the adhesive layers in display 14 to be highly flexible to accommodate bending of display 14 about bend axis 16. In contrast, brittle inorganic water vapor barrier layers have elastic modulus values of $10^8$ Pa or more. Adhesive layers in display 14 may have any suitable thicknesses (e.g., 1 micron or more, 5 microns or more, 10 microns or more, 50 microns or more, less than 25 microns, etc.).

If desired, potential damage from corrosion may be prevented by incorporating anticorrosion agents into the adhesive layers. The anticorrosion agents may, for example, be incorporated at a concentration of 0.5 weight percent or more, 0.1 weight percent or more, 0.1 to 0.5 weight percent or more, or less than 1 weight percent (as examples). Anticorrosion additives that may be incorporated into the adhesive layers of display 14 include copper anticorrosion agents such as benzotriazole, triazole, tetrazole, and others. Anticorrosion additives that may be incorporated into the adhesive layers of display 14 may also include silver nanowire anticorrosion agents such as triazole, tetrazole, benzotriazole, carboxyl, alkylthio, diazine, methylbenzimidazole, triazole-thiol, tetrazole-thiol, etc. In general, anticorrosion additives may be included that prevent corrosion of any sensitive structures in display 14 (e.g. indium tin oxide structures, other transparent conductive films such as indium zinc oxide structures, metal structures, silver nanowire structures, silver chloride structures, carbon nanotubes, graphene, metals such as copper, copper alloys, silver, gold, aluminum, etc.).

Another source of potential damage to display 14 involves ultraviolet light. When device 10 is operated in an outdoors environment or other location in which ultraviolet light is present, there is a risk that touch sensor components, polarizer components, pixels, and other display components may be degraded by exposure to the ultraviolet light. For example, capacitive touch sensor electrodes and conductive paths in display layers may be formed from silver nanowires that are sensitive to light, polarizers may contain light-sensitive structures, and organic emissive material in the light-emitting diodes of pixels 24 may be sensitive to light exposure. In configurations of display 14 that are based on liquid crystal pixels, liquid crystal materials may be sensitive to light exposure. In configurations of display 14 that are based on organic light emitting diodes, organic materials in the organic diode stack may be sensitive to light exposure.

To help prevent ultraviolet light damage to structures such as these in display 14, the adhesives in display 14 may be provided with ultraviolet light absorbing additives. Illustrative materials that block ultraviolet light include ultraviolet light absorbing particles of $TiO_2$, $ZnO$, $CeO_2$, $SnO_2$, $In_2O_3$, $Sb_2O_3$, and other particles of material that absorb ultraviolet light, ultraviolet-light-absorbing dyes such as hydroxyphenyl-benzotriazole, triazine, hydroxoyphenyl-triazine, and methoxycinnamate, and ultraviolet-light-absorbing compounds and ultraviolet-light-absorbing polymers such as benzophenone, benzotriazole, cyanoacrylate, polyethylene glycol, and ethylhexyl triazone. Ultraviolet-light blocking additives may, if desired, block at least 50% of ultraviolet light between 320 nm and 420 nm or between other suitable ranges of ultraviolet wavelengths.

Layers of display 14 may include polymers, glasses, and other materials that have indices of refraction that differ from each other and from surrounding air. It may be desirable to provide index-of-refraction matching layers in display 14 (e.g., layers of higher or lower index of refraction and/or layer stacks that contain materials of different indices and that may therefore serve as index matching layers, optical filters, etc.). If desired, index-of-refraction adjustment materials such as particles of silicon oxide, $Nb_2O_5$, other oxides, nitrides, oxynitrides, polymers, small molecules, and other index-adjusting materials may be incorporated into adhesive layers in display 14 to help reduce light reflections and/or improve viewing angles during the operation of display 14. Index-of-refraction adjustment layers may have thicknesses of 60-200 nm, more than 60 nm, less than 200 nm, or other suitable thicknesses and may be formed by converting all or part of one or more adhesive layers in display 14 to an index-matching layer (sublayer) or other layer with an adjusted refractive index. If, for example, an adhesive layer has an index of 1.5, an index lowering additive may be added to the adhesive layer so that the adhesive layer (or a portion of the adhesive layer) exhibits an index of refraction of 1.4 (as an example). If a higher refractive index is desired, an index raising additive may be added to the adhesive layer so that the adhesive layer (or a portion of the adhesive layer) exhibits an index of refraction of 1.6 (as an example). Combinations of these refractive index adjustments may be made, if desired. For example, the upper portion of an adhesive layer may be modified with an index lowering additive and the lower portion of an adhesive layer may be modified with an index raising additive while a central portion of the adhesive layer is left free of index adjusting additive, etc.

Figure 7:
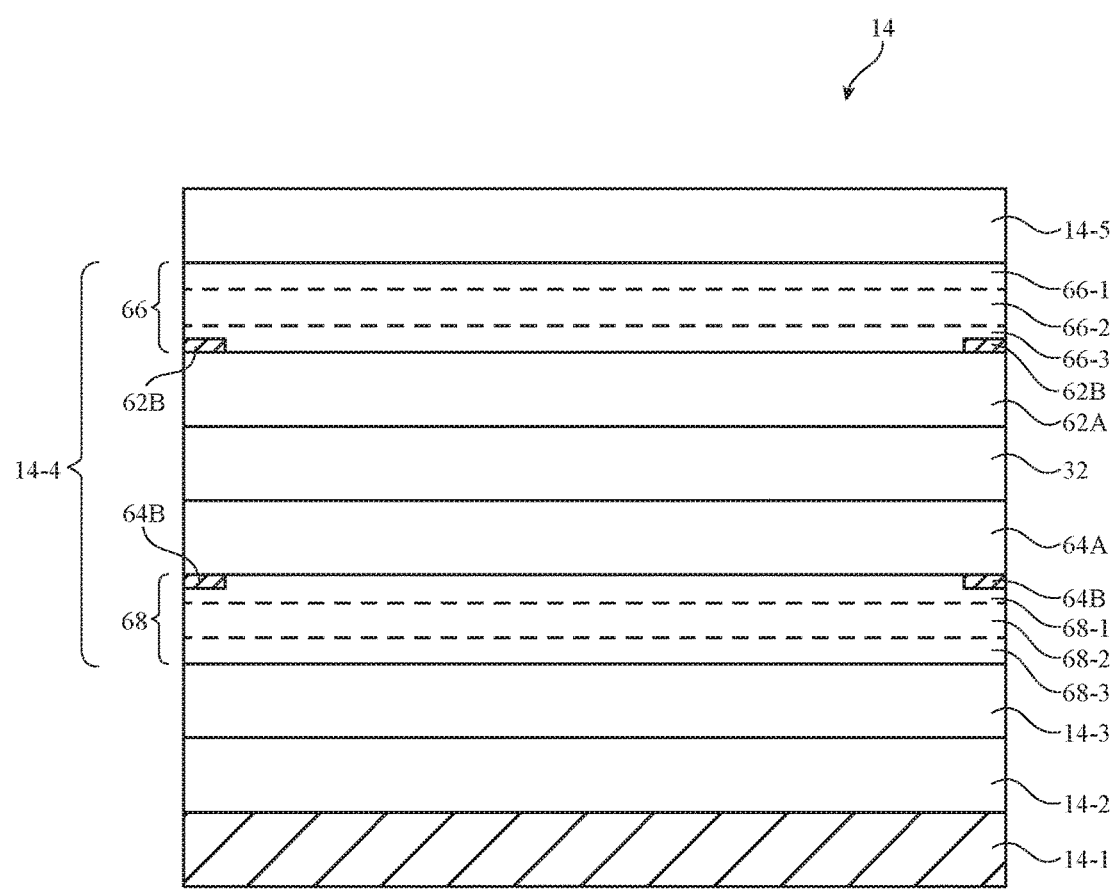
FIG. 7 is a cross-sectional side view of an illustrative display having optically clear adhesive layers in accordance with an embodiment.

FIG. 7 is a cross-sectional side view of display 14 in an illustrative configuration in which display 14 has one or more adhesive layers of the type that may include water vapor penetration reducing additives, corrosion reducing additives, ultraviolet light damage prevention additives, and/or index matching additives. As shown in FIG. 7, display 14 may, if desired, include a support layer such as layer 14-1. Layer 14-1 may be formed from a shape memory alloy, an amorphous metal layer, a polymer, or other suitable flexible material that resists plastic deformation when device 10 and display 14 are folded about bend axis 16. Layer 14-2 may be an organic light-emitting diode display layer of the type shown in FIG. 2A. Layer 14-3 may be a polarizer layer. Layer 14-4 may form a touch sensor such as touch sensor 30 of FIG. 2B. Layer 14-5 may be a flexible clear protective layer such as a flexible polymer display cover layer.

Layer 14-4 may include a substrate layer such as substrate layer 32. Substrate layer 32 may be formed from glass, quartz, polyethylene terephthalate (PET), cyclic olefin polymer, cyclic olefin copolymer, polyethylene naphthalate, or other transparent substrate materials. Conductive structures on the upper surface of substrate 32 such as patterned transparent conductive film 62A (e.g., indium tin oxide, silver nanowires, etc.) and patterned metal structures 62B (e.g., copper lines) may be used in forming structures such as conductive capacitive electrodes 34F of FIG. 2B and signal lines and conductive structures on the lower surface of substrate 32 such as patterned conductive film 64A (e.g., indium tin oxide, silver nanowires, etc.) and patterned metal structures 64B (e.g., copper lines) may be used in forming structures such as conductive capacitive electrodes 34R of FIG. 2B and signal lines.

In general, transparent conductive films 62A and 64A may be formed from indium tin oxide, indium zinc oxide, silver nanowires, AgCl, carbon nanotubes, graphene, or other transparent conductive materials. Metal structures 62B and 64B may be formed from copper, copper alloy, silver, gold, aluminum, or other metals. Polarizer layer 14-3 may be formed form polyvinyl alcohol, polystyrene, polycarbonate, or other polymers. Display layer 14-2 may be an organic light-emitting diode layer, may be a liquid crystal display, or may be any other suitable display layer having an array of pixels for presenting images to a viewer.

Optically clear adhesive layers such as adhesive layers 66 and 68 may be incorporated into display 14 to attach cover layer 14-5 to layer 14-4 and to attach polarizer 14-3 to layer 14-4. Layers 66 and 68 may be formed from liquid optically clear adhesive material, pressure sensitive optically clear adhesive, or other adhesive. Preferably, the elastic modulus of layers 66 and 68 is sufficiently low to facilitate bending of display 14 about bend axis 16.

Layer 66 and/or layer 68 may each include one or more sublayers such as layers 66-1, 66-2, 66-3, 68-1, 68-2, and 68-3. These sublayers may be formed by selectively incorporating additive into portions of layer 66 and/or layer 68. Additives that are incorporated in this way may include any suitable additives for enhancing the performance of layers 66 and 68 (e.g., water vapor penetration reducing additive, corrosion reducing additive, ultraviolet-light damage prevention additive, index-of-refraction adjusting additive, etc.). If, for example, it is desired to incorporate anticorrosion properties or other properties into the bottom of layer 66, anticorrosion additive or other suitable additive may be incorporated into sublayer 66-3 of layer 66. As another example, if it is desired to selectively lower the index of refraction of an upper portion of layer 66, index-of-refraction raising additive may be incorporated into sublayer layer 66-1 of layer 66. If desired, different additives may be added in different sublayers of layers 66 and/or 68 and or multiple additives may be added to a given sublayer. Arrangements in which one or more additives are incorporated uniformly into layer 66 and/or 68 may also be used.

In an illustrative configuration, a lower portion of layer 66 (e.g., layer 66-1 adjacent to conductive structures 62A and 62B) and an upper portion of layer 68 (e.g., layer 68-1 adjacent to conductive structures 64A and 64B) may include water vapor penetration reducing additive, corrosion reducing additive, and/or ultraviolet light damage prevention (ultraviolet light blocking) additive. These additives may also be incorporated into other portions of some or all of layers 66 and 68. If desired, the upper and/or lower portions of layers 66 and 68 and/or all of layers 66 and 68 may include index matching additives (index adjusting additive) to help match the index of refraction of substrate 32 to other layers (e.g., to layer 14-5, to layer 14-3, etc.) and thereby reduce undesired light reflections among the layers of display 14. In this type of configuration, middle sublayers such as layers 66-2 and 68-2 may be free of index adjusting additive. In general, any one of these additives, any two of these additives, any three of these additives, any four of these additives, and/or other additives may be incorporated into layer 66 and/or layer 68.

The foregoing is merely illustrative and various modifications can be made to the described embodiments. The foregoing embodiments may be implemented individually or in any combination.

What is claimed is:

1. An electronic device, comprising:
    a housing; and
    a flexible display in the housing having a bending region that bends about a bend axis, wherein the flexible display includes:
        an array of pixels formed on a flexible display substrate; and
        a touch sensor having a touch sensor substrate with opposing first and second surfaces, first conductive structures on the first surface, second conductive structures on the second surface, and optically clear adhesive on the first and second surfaces, wherein the optically clear adhesive comprises water vapor penetration reducing additive and wherein the optically clear adhesive comprises an additive selected from the group consisting of:

a corrosion reducing additive, an ultraviolet light damage prevention additive, and an index-of-refraction adjustment additive.

2. The electronic device defined in claim 1 wherein the optically clear adhesive has an elastic modulus of less than $10^6$ Pa.

3. The electronic device defined in claim 2 wherein the optically clear adhesive includes a first layer on the first surface and a second layer on the second surface, the electronic device further comprising a flexible polymer cover layer, wherein the first layer of the optically clear adhesive attaches the flexible polymer cover layer to the touch sensor.

4. The electronic device defined in claim 3 further comprising a polarizer layer, wherein the second layer of the optically clear adhesive attaches the polarizer to the touch sensor.

5. The electronic device defined in claim 4 wherein the optically clear adhesive comprises an adhesive layer of at least 5 microns in thickness that includes sufficient water vapor penetration reducing additive to limit a water vapor transmission rate through the adhesive layer to less than 5000 g/m²-day at 65° C. and 90% humidity.

6. The electronic device defined in claim 4 wherein at least some of the optically clear adhesive comprises an anticorrosion additive.

7. The electronic device defined in claim 4 wherein at least some of the optically clear adhesive comprises ultraviolet-light-damage-reducing additive.

8. The electronic device defined in claim 7 wherein the optically clear adhesive with the ultraviolet-light-damage-reducing additive blocks at least 50% of ultraviolet light between 320 nm and 420 nm.

9. The electronic device defined in claim 1 wherein the flexible display further comprises a support layer configured to support the array of pixels formed on the flexible display substrate.

10. The electronic device defined in claim 9 further comprising openings in the support layer that overlap the bend axis.

11. The electronic device defined in claim 9 wherein the support layer comprises metal.

12. The electronic device defined in claim 9 wherein the support layer comprises shape memory alloy.

13. The electronic device defined in claim 9 wherein the support layer comprises amorphous metal.

14. The electronic device defined in claim 13 wherein the optically clear adhesive includes ultraviolet-light blocking additive and anticorrosion additive.

15. The electronic device defined in claim 14 wherein the optically clear adhesive includes a layer having first, second, and third sublayers, wherein the second sublayer is interposed between the first and third sublayers, wherein the first and third sublayers include index-of-refraction adjustment additive, and wherein the second sublayer is free of the index-of-refraction adjustment additive.

16. The electronic device defined in claim 15 wherein the flexible display further comprises a plurality of bistable metal strips that run perpendicular to the bend axis.

17. An electronic device, comprising:
a housing; and
a flexible display in the housing having a bending region that bends about a bend axis between a folded and an unfolded state, wherein the flexible display includes:
an array of pixels formed on a flexible display substrate;
a flexible display cover layer;
a touch sensor between the flexible display cover layer and the array of pixels;
an amorphous metal support layer that supports the array of pixels and the flexible display substrate, wherein the array of pixels and the flexible display substrate are interposed between the amorphous metal support layer and the touch sensor; and
a plurality of bistable metal strips that run perpendicular to the bend axis, wherein the bistable metal strips have a curved cross-sectional profile that maintains the flexible display cover layer in the unfolded state.

18. The electronic device defined in claim 17 wherein the touch sensor has opposing first and second surfaces, first conductive structures on the first surface, second conductive structures on the second surface, and optically clear adhesive on the first and second surfaces, wherein the optically clear adhesive has an additive selected from the group consisting of: a water vapor penetration reducing additive, a corrosion reducing additive, and an ultraviolet light damage prevention additive.

19. A flexible display, comprising:
an organic light-emitting diode display layer having a flexible substrate;
a flexible display cover layer;
a metal support layer that supports the organic light-emitting diode display layer and that has a yield strain of at least 1%;
a polarizer layer;
a touch sensor substrate having first and second surfaces with conductive capacitive touch sensor electrodes;
a first layer of adhesive that attaches the flexible display cover layer to the touch sensor at the first surface and that has an elastic modulus of less than $10^6$ Pa;
a second layer of adhesive that attaches the polarizer to the touch sensor at the second surface and that has an elastic modulus of less than $10^6$ Pa, wherein the second layer of adhesive contains an ultraviolet light damage prevention additive, and wherein at least one of the first and second layers of adhesive includes a sublayer containing an index-of-refraction adjustment additive and at least one additive selected from the group consisting of: a water vapor penetration reducing additive and a corrosion reducing additive; and
a patterned metal structure directly on at least a portion of the second layer of adhesive.

* * * * *